(No Model.)
T. CHARLTON & K. M. MITCHELL.
PROCESS OF AND APPARATUS FOR MANUFACTURING AQUA AMMONIA.
No. 521,401. Patented June 12, 1894.
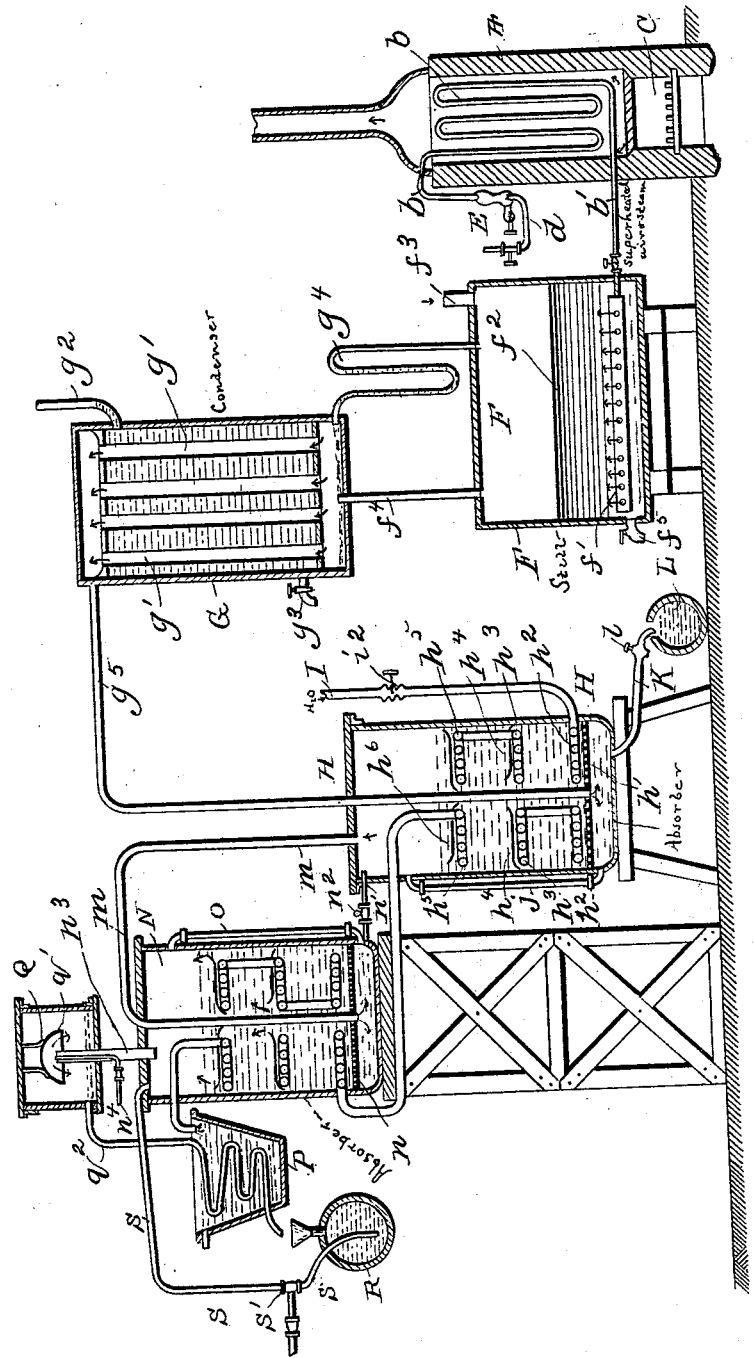
WITNESSES
INVENTORS

UNITED STATES PATENT OFFICE.

THOMAS CHARLTON, OF DENVER, COLORADO, AND KERR M. MITCHELL, OF ST. JOSEPH, MISSOURI.

PROCESS OF AND APPARATUS FOR MANUFACTURING AQUA-AMMONIA.

SPECIFICATION forming part of Letters Patent No. 521,401, dated June 12, 1894.

Application filed June 12, 1893. Serial No. 477,394. (No model.)

*To all whom it may concern:*

Be it known that we, THOMAS CHARLTON, of Denver city, Arapahoe county, Colorado, and KERR M. MITCHELL, of St. Joseph, in the county of Buchanan and State of Missouri, have invented certain new and useful Improvements in the Process of Manufacturing Aqua-Ammonia from Ammoniacal Liquors and in Apparatus Therefor; and we do hereby declare that the following is a full, clear, and exact description of the invention, which will enable others skilled in the art to which it appertains to make and use the same, reference being had to the accompanying drawing, and to letters of reference marked thereon, which forms a part of this specification.

This invention relates to a novel treatment of ammoniacal liquors, namely, with a current of mixed steam and air in order to separate the volatile ammonia compounds for the purpose of directly manufacturing aqua ammonia; and it consists in the process and means for practicing the same as hereinafter described and claimed.

The methods heretofore in use, so far as known to us, for manufacturing aqua ammonia, consist in separating the free ammonia as contained in the liquor to be worked, by means of a jet of steam turned directly into the ammoniacal liquor, and then leading away the gaseous vapors in condensing the vapors and absorption of the ammonia gases by contact with water.

According to our new process, the vapors are liberated by means of a current of steam and air. The steam passes through an inspirator, and thereby draws in a quantity of air; this mixed product of steam and air is then superheated by passing through a system of pipes contained in a vertical heated chamber, and then directly into the ammoniacal liquor. The volatile ammonia is set free, and its transmission from the still to the absorber is facilitated by the inspirated air which acts as a carrier for the gases.

In the old process of vaporizing of liquors by means of steam alone, owing to the large quantity of condensed water produced from the steam, the liquor became so surcharged and weakened in strength, that it was impossible when the charge was partially spent, to draw and separate the ammonia gases from the liquor.

In our improved process, the air and steam being superheated, generate the gases quicker by reason of the extra heat of the steam and the air which being non-condensible act as carriers, working the charge off quicker and more completely than by the old process. It is also necessary in this our improved method of working the liquor, that a large effective absorptive surface should be provided, in order to relieve the air of its ammonia gases. This is accomplished by means of two absorbers, and which also constitute an essential part of our invention.

In the drawing, we have illustrated in a single figure, mainly in vertical section, an apparatus adapted for practicing our improved process or method, the same being shown in vertical central section.

The machinery heretofore in use is a circular or cylindrical horizontal still, and this still is filled or partially filled with ammoniacal liquor; and the steam being turned on, the vapors passing off were led to a condenser. After the condenser, the gases (the ammonia gases) were purified by well known methods, and after passing through the purifier, the gases were led into the absorber, which absorber consists of a leaden vessel placed in a receptacle and surrounded by water. From this first absorber the gas passed to another absorber of the same description. The lead absorbers were charged with distilled water to about two-thirds of their depth. The ammonia gases in passing down through the water were absorbed by this distilled water.

In our process and apparatus we have: first, a vertical furnace A, provided with a steam coil $b$ running through it; a fire-box C under it, and with a suitable steam supply, as for instance through a pipe $d$; and also with an inspirator or injector E by which a current of air is drawn into this steam coil, or in any proper way whereby the air and steam shall become intermixed at this stage. This mixture of air and steam passes through the coil $b$ in the vertical furnace, and through its extension $b'$ into a cylindrical still F, finding its exit therein by means of a perforated pipe $f'$. This mixture of air and steam passes through these perforations $f'$ and up through the ammoniacal liquor (indicated at $f^2$) in the still, agitating and heating it, and carrying off with it the volatile ammonia from the ammoniacal liquor contained in this ammonia still or tank F. This still is filled in the first instance from any convenient storage tank through any suitable receiving pipes $f^3$. The air and steam thus surcharged with the volatile ammonia, passes off through the pipe $f^4$ in the top of the still F, into the bottom of the condenser or cooler G, which condenser consists of a cylindrical tank containing a number of vertical pipes $g'$ open at the top and bottom, and surrounded by the cooling water, which water is provided by means of a pipe $g^2$ opening into the upper portion of said condenser and capable of being discharged by means of the faucet or cock $g^3$ near the lower end. This condenser G is also provided with a siphon or sealing pipe $g^4$ connecting it near its bottom with the top of the still F, and whereby water of condensation may pass back from said condenser to the still, F. After passing through this condenser, the volatile ammonia and air surcharged with ammonia, is carried through another pipe $g^5$ down into and through the top and to the bottom of an absorber H, said pipe passing down to within a few inches of the bottom of said absorber, which we will call here the first absorber. This absorber is partially filled with distilled water, as shown, and is provided, a few inches above its bottom, with a perforated covering $h'$ extending over the whole bottom in such a way that the pipe above mentioned comes down through its center and discharges the vapors in all directions, as indicated by arrows; which vapors passing up through the perforations in the plate first encounter a coil of pipe $h^2$ filled with water, which acts as a cooler; then passing up through a second coil of pipe, $h^3$ (connecting with coil $h^2$, as shown) encounters a baffle-plate, $h^4$, extending from the inner periphery of said tank all around to within a short distance of its center, where the inner edge of said baffle-plate is turned up, as shown, permitting the escape of vapor through the center; thence passing up through the water above the first baffle-plate, it encounters another coil $h^5$ (connecting with coil $h^3$, as shown) filled with water, and a second baffle-plate $h^6$, which, instead of extending from the inner periphery of the tank, extends as shown from the central receiving pipe outward to within a short distance of the inner periphery of the tank; its outer perimeter is shown as turned up similarly to the inner perimeter of the plate $h^4$. The object of these baffle-plates is to compel the vapors which shall have passed down through the central pipe, and discharged into the water and passed up through the perforated plate in the bottom of the tank, to pass through a longer route or distance and to remain a longer time in contact with the absorbing fluid or water, than they would do if allowed to pass directly upward through the absorbing water;—the aim being to compel them to take a much longer course through the fluid than they would do if allowed to escape directly upward. This first absorber H is provided with a water pipe I, and water valve $i^2$, by which water may be injected into said coils; and it also is provided with a glass gage J, in order that the level of the water or fluid within the tank may be readily seen at all times. Also in the bottom thereof is provided a discharge pipe K provided with a drawing-off cock $l$ for drawing off the fluid into any cask or vessel L when it has reached the proper degree of strength. Leading from the top of absorber H is another pipe $m$ passing down through the top of another or second absorbing tank N, through its center, and to near the bottom thereof, and provided in a similar manner to first absorber H, with a perforated plate and condensing coils, and baffle-plates, for the purposes already above set forth. This absorber N is also partially filled, as shown, with distilled water, and is provided with a glass gage O for reading the level of the fluid within the tank; and the pipe of the coils contained in absorber H is continued up through the upper portion of the side of this absorber, and connects or is continuous with a similar system of coils commencing within and at the bottom of absorber N, and which coils are carried up in regular order toward its top, where it discharges into a vat or tank P for that purpose provided. At the bottom of absorber N is also provided a small pipe $n'$ provided with a cock $n^2$, and which pipe connects this absorber with the top of the absorber H, by means of which the liquor contained in absorber N may, at any time, be drawn off into absorber H. In this connection, the relative positions of absorbers H and N are such that the bottom of absorber N is on a level or nearly so, with the top of absorber H. In the top of absorber N is provided a vapor-discharge pipe $n^3$ leading upward into a cylindrical mixing vessel Q. At a short distance above absorber N, and below where said pipe joins the cylindrical mixing vessel, it is joined by a small steam pipe $n^4$ which passes into said pipe $n^3$, and thence upward through the same; the upper end of the inner steam pipe being slightly above the upper end of this vapor pipe. The cylindrical mixing chamber Q, above mentioned, is provided with a circular concaved deflecting cap $q'$, which is suspended, as shown, from the upper portion and directly over the opening in the pipe $n^4$ above mentioned, in such manner that when vapor and steam jets pass up through these pipes, the joint current striking forcibly against the deflecting cap is forced downward in every direction so as to thoroughly mix the contents of the chamber. At or near the bottom and at one side of said chamber, is provided a pipe $q^2$ leading therefrom to a tank P down through which it passes in the form of a coil, discharging its contents finally into a tank or cask R provided for that purpose—this being the same tank into which the water from the condensing pipes above mentioned, is discharged, and which may if desired be provided with an escape or overflow pipe near its top. A small steam pipe $s$ is also provided, having an injector $s'$ which opens into the cask or receptacle R above mentioned, by which means the fluid in the cask may be thrown back at the will of the operator into the top of absorber N, and thence, if necessary, by means of the small pipe and cock $n'$ $n^2$ above mentioned, into absorber H.

The operation is as follows: Ammoniacal liquor, to any quantity desired, is placed in the still, and absorbers H N are partially filled with distilled water; a current of mixed steam and air is thrown into the still F by means of the vertical furnace, steam coil, &c., and the perforated pipe $f'$. The combined steam and air passing up through the liquor, becomes surcharged with the volatile ammonia, which is carried up with them into the condenser, where the steam is condensed out and passes back into said tank through the seal $g^4$. The ammoniacal vapors pass up through the condenser G, through the pipe $g^5$, down into H, the first absorber, and up through the perforated plate $h'$, and by means of the appliances above set forth, are compelled to leave a certain quantity of ammoniacal vapor in solution with the distilled water in this absorber. Such portion of vapor as is not condensed and absorbed in absorber H, passes up through the pipe $m$ into absorber N, there it passes through the same process as in H; it is then carried off through the pipe and mixed with a small quantity of steam in the mixing chamber Q, and thence passes off through the coil in the receiving tank P, and down into the receiving cask R. The result is, that the liquor in absorber H will be much stronger than that in absorber N, and will first attain the proper degree of strength to be drawn off, at which time the liquor in absorber N will not have attained that degree of strength, and the liquor passing off through the mixing chamber and steam coil, will have attained a still less degree of strength. When, therefore, the liquor in absorber H has attained sufficient strength, it is drawn off into a receiver through the pipe $k$ in the bottom of the absorber, and refilled with liquor from absorber N, which in turn is re-filled through the small steam pipe by a weaker liquor contained in the final receiving cask, and the process repeated indefinitely. The pipe leading up into the bottom of the condenser from the ammonia tank or still F, is carried up a certain distance above the bottom of the tank, as shown, and water is allowed to accumulate up to the top of that pipe, until it is led off through the seal $g^4$ and back into the still. In brief, the absorbers H and N are first filled with distilled water, which becomes charged with volatile ammonia as the same passes through it on its way from the ammoniacal still, until sufficient strength is infused into the distilled water in the various absorbers whether two or more. In the bottom of the ammonia still is provided a drawing-off cock $f^5$ by which the residuum may be drawn off, and the still cleansed, when the charge is spent. The steam passing through an inspirator E, draws into the still a quantity of air; this product (combined steam and air) is superheated by passing through the system of pipes contained in the vertical furnace, and then directly into the ammoniacal liquor; the volatile ammonia is set free and its transmission (from the still to the absorber) is facilitated by the inspired air, which acts as a carrier for the gases.

In our process the combined air and steam being superheated, generate the gases quicker by reason of the extra heat of the steam; and the air being non-condensible, acts as a carrier, working the charge off quicker and more completely than by the old process.

Having thus fully described our invention, what we claim, and desire to secure by Letters Patent, is—

1. The described process of treating ammoniacal liquors, to separate and eliminate therefrom free ammonia, consisting in forcing into and through such liquors, a superheated mixture of air and steam, passing upward such combined steam and air thus surcharged with the volatile ammonia, into a condenser in which the steam is condensed, and carrying forward the ammoniacal liquors or vapors through absorbers, and mixing with a little steam that portion of the vapors which has not been absorbed, and then discharging it into a suitable receiving vessel, all substantially as set forth.

2. The described process of treating ammoniacal liquor to extract ammonia therefrom, consisting in first passing mixed air and steam through the liquor, and through a condenser and absorbers, withdrawing the strong liquor from the first absorber, and then returning the residuum liquor in the reverse direction from the last to the first absorber, all substantially as set forth.

3. The described process of treating ammoniacal liquors to separate and eliminate therefrom free ammonia, consisting in forcing into and through such liquors a superheated mixture of air and steam, passing upward such combined steam and air thus surcharged with the volatile ammonia, into a condenser in which the steam is condensed, and carrying forward the ammoniacal vapors through absorbers, and mixing with a little steam that portion of the vapors which has not been absorbed, then discharging it into a suitable receiving vessel, and then returning such aqua ammonia in the reverse direction from the last to the first absorber, to be again treated, all substantially as set forth.

4. In an apparatus for eliminating free ammonia from ammoniacal liquors, the combination with an absorber, of the mixing chamber Q, vapor pipes $n^3$ and $n^4$ one extending above the other, the concave deflector cap $q'$, suspended over the tops of both these pipes, and the discharge pipe $q^2$, leading from said chamber to a receiving tank, all substantially as set forth.

5. The absorber having in combination with a perforated plate within it and near its bottom, a pipe $g^5$ serving to conduct the ammoniacal vapors from the condenser into the space in the absorber beneath such plate,—the system of horizontal pipe coils above such plate located one coil above the other, and connecting with each other alternately at their centers and circumferences as shown, and the baffle-plates $h^4$, $h^6$, one extending from the inner periphery of the tank and having a central opening, and the other extending from the central pipe $g^5$ and leaving a space between its upturned edge and the inner periphery of the tank, all substantially as set forth.

6. The absorber having in combination with a perforated plate within it and near its bottom, a pipe $g^5$ serving to conduct the ammoniacal vapors from the condenser into the space in the absorber beneath such plate,—the system of horizontal pipe-coils above such plate, located one coil above the other and connecting with each other alternately at their centers and circumferences as shown,—and the baffle-plates $h^4$, $h^6$, one extending from the inner periphery of the tank and having a central opening, and the other extending from the central pipe $g^5$ and leaving a space between its upturned edge and the inner periphery of the tank, and another absorber having a similar system of baffle-plates and similar coil pipes connecting with coil $h^5$, all substantially as set forth.

7. In combination with a still, the pipe $f^4$ leading therefrom, the siphon pipe $g^4$, the condenser and its pipes $g'$, and vapor pipes $g^5$ leading from the condenser through the top of the absorber to a space beneath its interior perforated bottom.

8. In combination with the absorbers, the mixing chamber Q, the pipes $n^3$, $n^4$, discharging coil $q^2$, reservoir R, pipe $s$, injector $s'$, and pipe and cock $n'$ $n^2$ all substantially as set forth.

THOMAS CHARLTON.
KERR M. MITCHELL.

Witnesses for T. Charlton:
HENRY C. RUDGE,
GEORGE L. VAIL.

Witnesses for K. M. Mitchell:
M. I. HUMISTON,
STEPHEN S. BROWN.